[12] United States Patent
Pan et al.

(10) Patent No.: US 8,600,406 B2
(45) Date of Patent: Dec. 3, 2013

(54) SYSTEM AND METHOD FOR LOCATION DETERMINATION FOR MOBILE CLIENTS

(76) Inventors: Shaowei Pan, Kildeer, IL (US);
 Xiaohua Wu, Kildeer, IL (US);
 Chuntao Zhang, Streamwood, IL (US)

( * ) Notice: Subject to any disclaimer, the term of this patent is extended or adjusted under 35 U.S.C. 154(b) by 213 days.

(21) Appl. No.: 12/592,447

(22) Filed: Nov. 25, 2009
 (Under 37 CFR 1.47)

(65) Prior Publication Data

US 2011/0124348 A1 May 26, 2011
 US 2012/0238293 A9 Sep. 20, 2012

Related U.S. Application Data

(63) Continuation-in-part of application No. 11/757,194, filed on Jun. 1, 2007.

(51) Int. Cl.
 *H04W 24/00* (2009.01)
(52) U.S. Cl.
 USPC .......... 455/456.2; 455/456.1; 455/456.3; 455/456.4; 455/456.5; 455/456.6
(58) Field of Classification Search
 USPC .................................. 455/456.1–6
 See application file for complete search history.

(56) References Cited

U.S. PATENT DOCUMENTS

| 5,689,269 | A | * | 11/1997 | Norris | 342/357.31 |
| 6,885,337 | B2 | * | 4/2005 | Jendbro et al. | 342/357.4 |
| 2002/0097181 | A1 | * | 7/2002 | Chou et al. | 342/357.06 |
| 2004/0152471 | A1 | * | 8/2004 | MacDonald et al. | 455/456.1 |
| 2008/0299994 | A1 | * | 12/2008 | Zhang et al. | 455/456.6 |

* cited by examiner

*Primary Examiner* — Jinsong Hu
*Assistant Examiner* — William Nealon
(74) *Attorney, Agent, or Firm* — Garlick & Markison; Bruce E. Stuckman

(57) ABSTRACT

A first position (104) of the mobile client is determined at least in part by utilizing first signals received from at least one first signal source. The first signal source operates in a first location determination system (114). A second position (106) of at least one second signal source (120) is determined by utilizing both the determined first position of the mobile client and second signals received from the at least one second signal source (120). The second signal source (120) operates in a second location determination system. A third position (116) of the mobile client is determined utilizing the second signal source (120).

9 Claims, 5 Drawing Sheets

SYSTEM AND METHOD FOR LOCATION DETERMINATION FOR MOBILE CLIENTS

CROSS REFERENCE TO RELATED PATENTS/PATENT APPLICATIONS

The present U.S. Utility Patent Application claims priority pursuant to 35 U.S.C. §120, as a continuation-in-part (CIP), to the following U.S. Utility Patent Application:

1. U.S. Utility application Ser. No. 11/757,194, filed Jun. 1, 2007, co-pending.

FIELD OF THE INVENTION

The field of the invention relates generally to networks and more particularly to locating mobile clients within networks.

BACKGROUND OF THE INVENTION

In many situations, a mobile client moves between or within different types of systems and networks. For example, a mobile client such as a cellular phone, pager, personal digital assistant, or personal computer may move from a satellite communication system to a Wireless Local Area network (WLAN). In another example, a mobile client may move between access points that are positioned within a WLAN. Today's networks also support services such ubiquitous computing, context aware services, and the seamless mobility of mobile clients. In order to provide and support many of these services, it is often desirable and/or necessary to be able to track and/or determine the location of the mobile client quickly and efficiently.

When a mobile client moves between systems or within systems, the location of the mobile client may sometimes become undetermined due to poor or non-existent network coverage or because of other conditions. For instance, a mobile client may operate within a satellite system and there may be locations where coverage from the satellite system is not provided. In another example, when a mobile client operates within a WLAN that provides coverage for a building, the mobile client may transition between different access points within the WLAN, and may be sometimes unlocatable during these transition periods. Consequently, network services that depend upon knowing the location of the mobile client may be difficult or costly to provide.

Previous systems have attempted to address these situations and provide for the effective and continuous location determination of mobile clients. For example, previous WLAN systems have utilized different types of mapping approaches. In some of these previous approaches, the mobile client was carried through the building in order to learn the location of the access points of the WLAN. Unfortunately, these approaches were expensive, time consuming, and inconvenient to implement. Additionally, these previous mapping approaches were often unsuccessful because the location of the access points was assumed to be known, when, in fact, the location of the access points was sometimes not known. As a result, these previous approaches have been unable to allow mobile clients to seamlessly move between different systems and within different systems. Additionally, since the location of the mobile client often became unknown, providing network services that depended upon knowing the mobile client location became expensive, difficult, and/or impossible to achieve.

BRIEF DESCRIPTION OF THE DRAWINGS

The above needs are at least partially met through provision of a system and method for location determination for mobile clients described in the following detailed description, particularly when studied in conjunction with the drawings, wherein.

Figure 1:
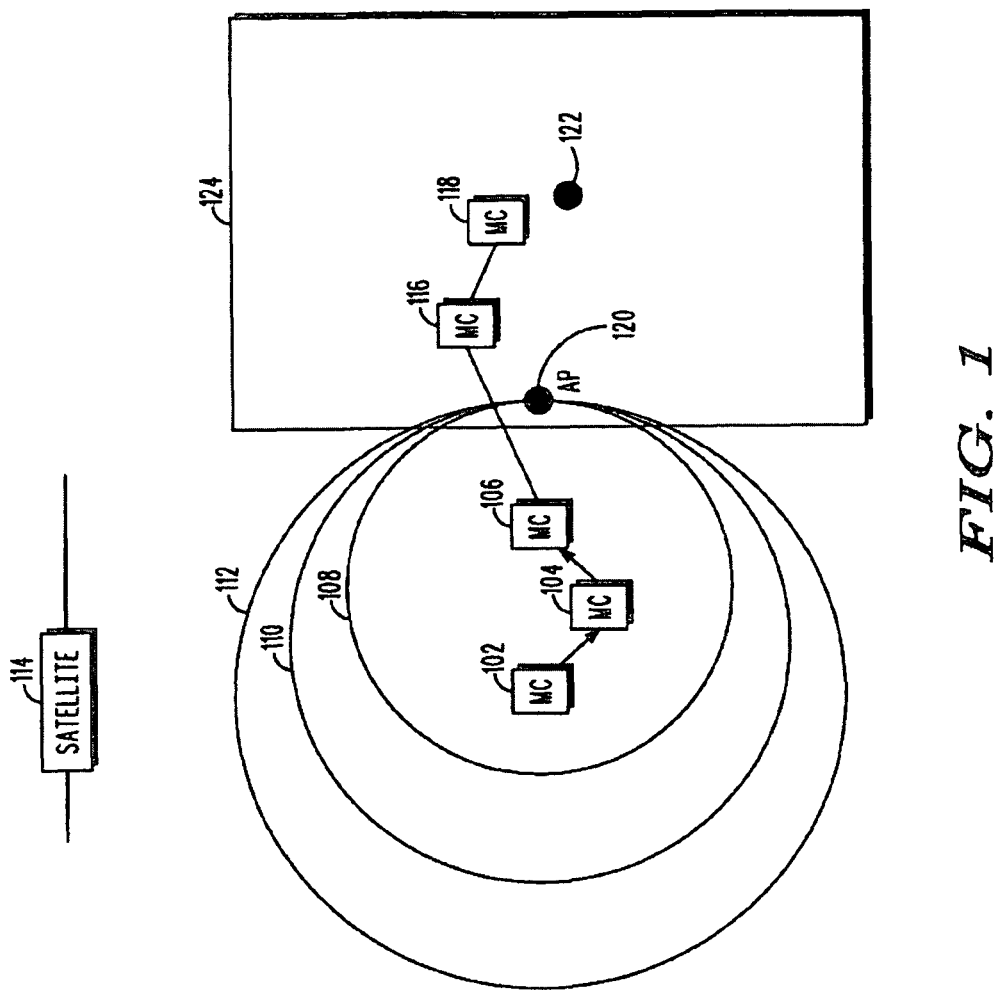
FIG. 1 comprises a block diagram of a system for the location determination of mobile clients in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method are provided that substantially continuously determine the location of a mobile client even as the mobile client moves between or within different types of networks or systems. The approaches provided herein provide for the seamless transitioning of the mobile client between different networks and within these networks. By knowing the location of the mobile client, various types of services can be effectively provided to the mobile client. These approaches are also cost-effective to implement and do not require a costly and time-consuming mapping process to be performed.

In many of these embodiments, a first position of a mobile client is determined at least in part by utilizing first signals that are received from at least one first signal source. The first signal source operates in a first location determination system. A second position of at least one second signal source is determined by utilizing both the determined first position of the mobile client and second signals that are received from at least one second signal source. The second signal source operates in a second location determination system. A third position of the mobile client is then determined utilizing the second signal source. In other examples, a fourth position of the mobile client is determined by utilizing a third position of the mobile client and third signals received from at least one third signal source.

The first signal source, the second signal source, and the third signal source may utilize any type of technology. For example, the first signal source and the second signal source may be satellite systems or signaling beacons. In one example, the first signal source includes at least one Global Positioning System (GPS)-compliant satellite and the second signal source comprises at least one beacon operating in a Wireless Local Area Network (WLAN). Furthermore, the beacons may be access points that operate within the WLAN.

In others of these approaches, the first signal sources may include multiple satellites and utilize various techniques to determine the location of the mobile client. For example, the first signal sources may include a first GPS-compliant satellite, a second GPS compliant satellite, and a third GPS-compliant satellite. In this example, the first position may be determined from the triangulation of the signals received from the first GPS-compliant satellite, the second GPS-compliant satellite, and the third GPS-compliant satellite.

In others of these approaches, first signals are received from at least one first signal source at a mobile client. The first signal source operates in a first location determination system. A first position of the mobile client is determined using at least in part the first signals. Second signals are received from at least one second signal source. The second signal source operates in a second location determination system. A second position of the second signal source using at least in part the second signals and the first position of the mobile client. Reception of the at least one first signal source is then lost. A third position of the mobile client is subsequently determined using at least in part the second position of the at least one second signal source and third signals received from the second signal source.

Furthermore, reception of the first signal source may become partially lost and a fourth position of the mobile client is subsequently determined using fourth signals received from the first signal source and fifth signals received from the second signal source.

Thus, approaches are provided that substantially continuously determine the location of a mobile client even as the mobile client moves between or within networks. The approaches provided herein allow for the seamless transitioning of the mobile client between different networks, facilitate the provision of services to the mobile client, are cost-effective to implement, and do not require costly and time-consuming mapping processes to be performed.

Referring now to FIG. 1, one example of a system for providing location determination for a mobile client is described. A mobile client moves into a variety of positions 102, 104, 106, 116, and 118. A satellite system 114 is utilized as a first location determination system for the mobile client when, for example, the mobile client is operating outside of any buildings in an external environment. A WLAN within a given building 124 is utilized as a second location determination system, for example, when the mobile client is within or near the building 124. The WLAN includes a first access point 122 and a second access point 120. It will be understood that the type and number of location determination systems may vary. Moreover, it will also be appreciated that the specific type of location determination equipment utilized by a particular location determination system may vary. Furthermore, it will be understood that any of the systems that provide location determination services may provide any other type of service or services (e.g., ubiquitous computing, context aware services, or seamless mobility) to the mobile client. Additionally, the mobile client may be any type of mobile communication device such as a cellular phone, pager, personal digital assistant, or personal computer. Other examples of mobile clients are possible.

The satellite system 114 may include multiple satellites and utilize various techniques to determine the location of the mobile client. For example, the satellite system 114 may include a first GPS-compliant satellite, a second GPS-compliant satellite, and a third GPS compliant satellite. In this example, any of the positions 102, 104, and 106 of the mobile client may be determined from a triangulation of the first signals received from the first GPS-compliant satellite, the second GPS-compliant satellite, and the third GPS-compliant satellite.

In one example of the operation of the system of FIG. 1, the positions 102, 104 and 106 of the mobile client are determined by utilizing signals received from the satellite system 114. In one approach, the positions 102, 104, and 106 may be determined by triangulating signals received from individual satellites employed by the satellite system 114.

The position of the access point 120 is then determined by utilizing both the determined positions 102, 104, and 106 of the mobile client and signals received from the access point 120. Once the position of the access point 120 is determined, the position 116 of the mobile client can be determined utilizing the now known position of the access point 120.

The mobile client then moves to the position 118 and the coordinates of the position 118 can be determined by using signals received from the access point 120. As the mobile client moves within the building 124, it may sense additional access points (e.g., the access point 122) having unknown locations. Since the location of the mobile client is known, the unknown location of the access point 122 can be determined. In one example, this location may be obtained by using Received Signal Strength (RSS) techniques. The location of the mobile client can be determined as it moves from the location 118 to other locations by using the now known location of the access point 122. This process can be repeated to determine the locations of other access points and the positions of the mobile client as moves into and operates within the coverage areas of the newly discovered access points.

In another example of the operation of the system of FIG. 1, signals from the satellite system 114 are received at the mobile client. The position 102 and the position 104 of the mobile client are determined using these signals. At the positions denoted by reference numerals 102 and 104, signals are received by the mobile client from the access point 120 in the WLAN. The position of the access point 120 is then determined using these received signals and the determined position 102 of the mobile client, for example, using RSS techniques.

Reception of the at least one first signal source is then at least partially lost as the mobile client moves to the position denoted as 106 and then to the position denoted as 116. In this case, the position 106 of the mobile client may be determined using signals received from the satellite system 114 and signals received from the access point 120. The later position 116 of the mobile client is subsequently determined using the now known position of the access point 120 and signals received from the access point 120.

The location of the access point 120 may be determined using various techniques. In one example, the position of the access point 120 may be determined by obtaining three sets of data and finding the intersection of this data. Specifically, a first set of data (obtained when the mobile client is at position 102) defines a first circle 112, a second set of data (obtained when the mobile client is at position 104) defines a second circle 110 and a third set of data (obtained when the mobile client is at position 106) defines a third circle 108. The radius of each circle represents a distance from the mobile client to the access point 120. From the perspective of the mobile client, the access point is positioned somewhere along the radius of each circle 108, 110, or 112. However, by finding the intersection of the three circles 108, 110, and 112, the location of the access point can be precisely determined.

Figure 2:
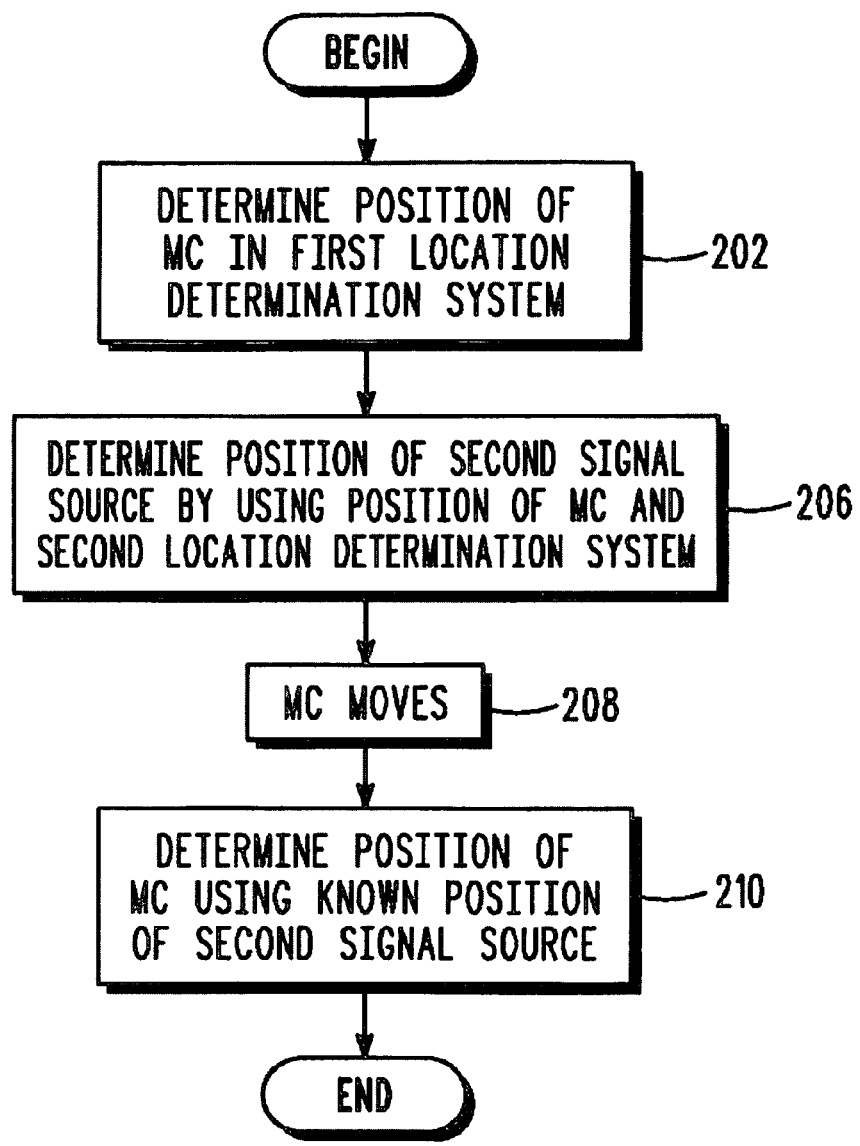
FIG. 2 comprises a flow chart of one example of an approach for determining the location of a mobile client according to various embodiments of the invention.

Referring now to FIG. 2, one example of an approach for determining the position of a mobile client is described. At step 202, a first location of the mobile client within a first location determination system is made. For example, a GPS satellite system may be used to determine the location of the mobile client as the mobile client operates within the parking lot of a shopping center.

At step 206, the position of a second signal source is determined by using the position determined for the mobile client (at step 202) and a second location determination system. For example, the position of an access point may be determined by knowing the position of the mobile client that was obtained by using the satellite system (at step 202) and by using RSS techniques from signals received from the access points.

At step 208, the mobile client moves. For example, the mobile client may move from the parking lot into a building. At step 210, due to the movement, the position of the mobile client becomes unknown and the position of the mobile client may be determined by using the known position of the second signal source. For example, if the second signal source is an access point within a WLAN, RSS techniques can be used to determine the position of the mobile client.

It will be appreciated that the above-described process can be repeated to determine the position of the mobile client and/or new signal sources. For example, to continue with the current example, the known position of the mobile client can be used to determine unknown positions of other access points in the building. As the access point locations become known and the position of the mobile client becomes unknown, the now known positions of the newly discovered access points can be used to determine the unknown positions of the mobile client. This "chaining" process can be repeated as long as needed to seamlessly determine the location of mobile clients as these mobile clients move between networks or within networks.

Figure 3:
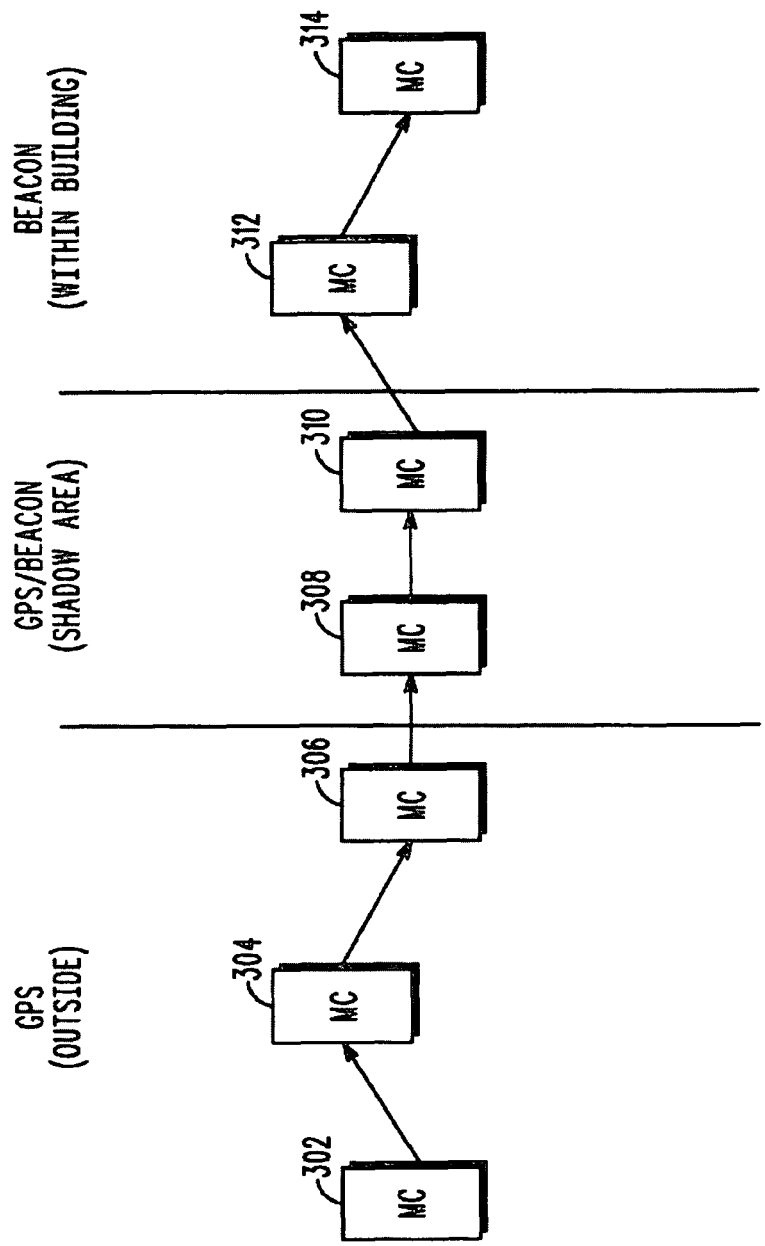
FIG. 3 comprises a block diagram of a system according to various embodiments of the invention.

Referring now to FIG. 3, one example of a system for determining the location of a mobile client is described. A mobile client is initially positioned in an exterior location (e.g., a parking lot) at a first position 302 and moves from the first position 302 to a second position 304, and then to a third position 306. In any of these locations, the location of the mobile client is determined by using a GPS satellite system. Additionally, in any of these positions, the mobile client attempts to locate access points from an in-building WLAN, and then uses the known position of the mobile client to determine the positions of these access points.

As the mobile client moves from the position 306 to a location 308, it moves (at least partially) out of the coverage area of the GPS to a shadow area of a building where reception from the GPS system may be sporadic and/or unreliable. The mobile client then moves into a position 310. In the shadow area (positions 308 and 310), both GPS and WLAN systems are available and an aggregate of both types of data is used to determine the location of the mobile client.

The mobile client then moves into an area outside the coverage of the satellite system (e.g., within the building) to a position 312 and then to a position 314. The locations of the mobile client can then be determined using the known positions of the access points within the building. For example, RSS techniques can be used to determine the location of the mobile client at positions 312 and 314.

It will be appreciated that the mobile client movement described with respect to the approach of FIG. 3 is one example only. Moreover, different types of location determination systems can be used and the positioning of these systems can be altered. In addition, the movement of the mobile client can be reversed or changed.

Furthermore, the process can be used to determine further mobile client locations. For example, as the mobile client moves out of the coverage area of known access points in the building, it can discover new access points and obtain the positions of these access points by using the known position of the mobile client. The newly obtained access point locations can in turn be used to determine the position of the mobile client as it loses communication (e.g., moves out of the range) of other access points. In this way, the mobile client can seamlessly transition between different networks/location determination systems and within these systems.

Figure 4:
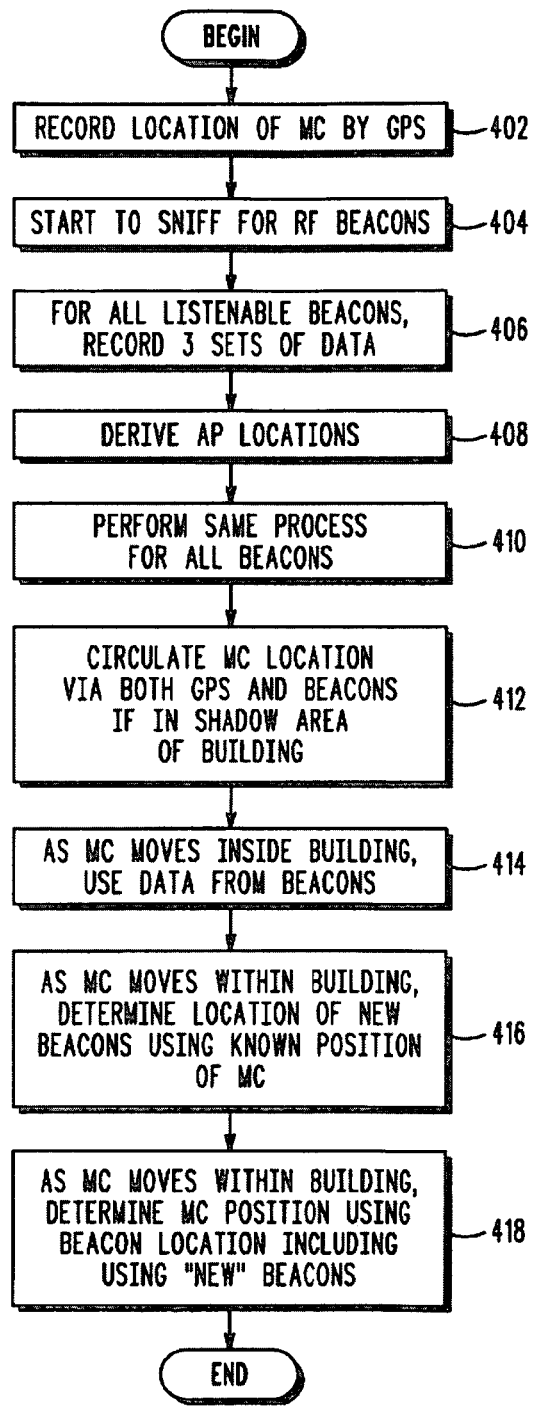
FIG. 4 comprises a flow chart of one approach for determining the location of a mobile client according to various embodiments of the invention.

Referring now to FIG. 4, another example of an approach for determining the location of a mobile client is described. At step 402, the location of a mobile client is recorded and this location is determined by the GPS system. At step 404, the mobile client starts to attempt to locate (sniff) for RF beacons (e.g., access points). At step 406, for all of the listenable RF beacons determined at step 404, three sets of data are obtained. At step 408, the data is used to obtain the position of the first beacon. The three sets of data define a circle and the intersection of the three circles is where the RF beacon is located. At step 410, the same process is performed to obtain the location of each beacon.

At step 412, the mobile client moves into the shadow area of a building. Under these conditions, the location of the mobile client is determined by using both the GPS system and the RF beacons. At step 414, as the mobile client moves into a building, and known positions of the RF beacons are used to determine the location of the mobile client. In one example, RSS techniques can be used.

Subsequently, at step 416, the mobile client moves within the building and detects other access points having unknown locations. The known location of the mobile client can be used to determine the location of the new RF beacons. At step 418, as the mobile client moves out of the coverage area of known RF beacons, the position of the new RF beacons may be used to determine the location of the mobile client. This approach can be repeated to determine the positions of additional RF beacons and the subsequent positions of the mobile client as it enters and then operates within the coverage areas of the addition RF beacons.

Figure 5:
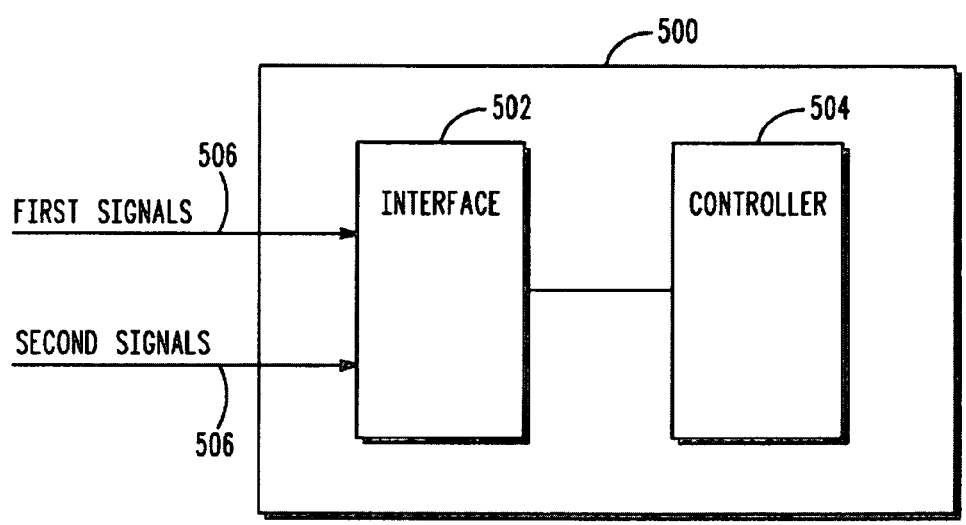
FIG. 5 comprises a block diagram of a device according to various embodiments of the invention.

Referring now to FIG. 5, an example of a device 500 used for location determination is described. The device 500 includes an interface 502 and a controller 504. In one example, the device 500 is a mobile client such as a cellular phone, a pager, a personal digital assistant or a personal computer.

The interface 502 is adapted and configured to receive first signals 506 from at least one first signal source (e.g., a satellite) that operates in a first location determination system (e.g., a satellite system) and second signals 508 from at least one second signal source (e.g., an RF beacon) that operates in a second location determination system (e.g., a WLAN).

The controller 504 is adapted and arranged to determine the position of a mobile client at least in part by utilizing the first signals from the first signal source and is further adapted and arranged to determine the position of the second signal source by using both the position of the mobile client and the signals received from the second signal source.

The controller 504 may be further adapted and arranged to determine a third position of the device 500 by utilizing the second position and third signals from the at least one second signal source.

Thus, approaches are provided that substantially continuously determine the location of a mobile client as the mobile client moves between or within different types of networks. The approaches provided allow for the seamless transitioning of the mobile client between different networks and within networks and allow for the location of the mobile client to be substantially continuously known. In so doing, services dependent upon knowing the location of the mobile client can be effectively provided to the mobile client. Furthermore, the approaches provided herein are cost-effective to implement and do not require a costly and time consuming mapping process to be performed.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of seamlessly determining successive positions of a mobile client comprising:
    determining a first position of the mobile client at least in part by utilizing first signals received from at least one first signal source, the at least one first signal source operating in a first location determination system;
    determining a second position of at least one second signal source by utilizing both the determined first position of the mobile client and second signals received from the at least one second signal source, the at least one second signal source operating in a second location determination system that is different from the first location determination system; and
    determining a third position of the mobile client utilizing the at least one second signal source;
    wherein the at least one first signal source and the at least one second signal source are selected from a group comprising: at least one satellite and at least one signaling beacon.

2. The method of claim 1 wherein the at least one first signal source comprises at least one Global Positioning System (GPS)-compliant satellite and wherein the at least one second signal source comprises at least one beacon operating in a Wireless Local Area Network (WLAN).

3. The method of claim 2 wherein the at least one second signal source comprises an access point (AP) operating in a Wireless Local Area Network (WLAN).

4. The method of claim 1 further comprising determining a fourth position of the mobile client by utilizing the third position and third signals received from at least one third signal source.

5. The method of claim 1 wherein the at least one first signal source comprises a first Global Positioning System (GPS)-compliant satellite, a second GPS-compliant satellite, and a third GPS-compliant satellite, and wherein determining the first position comprises determining the first position from a triangulation of the first signals received from the first GPS-compliant satellite, the second GPS-compliant satellite, and the third GPS-compliant satellite.

6. A mobile client comprising:
    an interface, the interface adapted and configured to receive first signals from at least one first signal source that operates in a first location determination system and second signals from at least one second signal source that operates in a second location determination system that is different from the first location determination system; and
    a controller coupled to the interface and that is adapted and arranged to determine a first position of a mobile client at least in part by utilizing the first signals from the at least one first signal source and that is further adapted and arranged to determine a second position of at least one second signal source by using both the first position and the second signals from the at least one second signal source;
    wherein the at least one first signal source and the at least one second signal source are selected from a group comprising: at least one satellite and at least one signaling beacon.

7. The mobile client of claim 6 wherein the at least one first signal source comprises at least one Global Positioning System (GPS)-compliant satellite and wherein the at least one second signal source comprises at least one beacon operating in a Wireless Local Area Network (WLAN).

8. The mobile client of claim 6 wherein the controller is further adapted and arranged to determine a third position of the mobile client by utilizing the second position and third signals from the at least one second signal source.

9. The mobile client of claim 6 wherein the at least one first signal source comprises a first Global Positioning System (GPS)-compliant satellite, a second GPS-compliant satellite, and a third GPS-compliant satellite, and wherein the controller is programmed to determine the first position from a triangulation of signals received from the first GPS-compliant satellite, the second GPS-compliant satellite; and the third GPS-compliant satellite.

* * * * *